US011793174B2

(12) United States Patent
Abban et al.

(10) Patent No.: US 11,793,174 B2
(45) Date of Patent: Oct. 24, 2023

(54) SYSTEM AND METHOD FOR REMOVING VARROA MITES FROM BEES

(71) Applicant: The United States of America, as represented by the Secretary of Agriculture, Washington, DC (US)

(72) Inventors: Samuel K. Abban, Laurel, MD (US); Irving Smith, Glenleg, MD (US); Francisco Posada-Florez, Laurel, MD (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 50 days.

(21) Appl. No.: 16/999,161

(22) Filed: Aug. 21, 2020

(65) Prior Publication Data

US 2022/0053738 A1     Feb. 24, 2022

(51) Int. Cl.
*A01K 51/00* (2006.01)
*A01K 13/00* (2006.01)

(52) U.S. Cl.
CPC ............ *A01K 51/00* (2013.01); *A01K 13/001* (2013.01)

(58) Field of Classification Search
CPC .. A01K 51/00; A01K 13/001; B65D 21/0209; B65D 21/0211; B65D 21/0228
USPC .................................................. 449/1, 2, 61
See application file for complete search history.

(56) References Cited

U.S. PATENT DOCUMENTS

| | | | | |
|---|---|---|---|---|
| 3,367,308 A | * | 2/1968 | Quattrone | A01K 1/031 119/420 |
| 4,867,731 A | * | 9/1989 | Willard | A01K 51/00 449/2 |
| 6,468,129 B1 | * | 10/2002 | Griffith | A01K 51/00 449/20 |
| 6,702,645 B2 | * | 3/2004 | Vanderpool | A01K 51/00 449/2 |
| 10,959,410 B2 | * | 3/2021 | Siefert | A01K 51/00 |
| 2004/0262306 A1 | * | 12/2004 | Smith | B65D 21/0228 220/4.26 |
| 2008/0280528 A1 | * | 11/2008 | Mudd | A01K 47/06 449/2 |
| 2011/0290805 A1 | * | 12/2011 | Rances | B65D 21/083 220/529 |

(Continued)

FOREIGN PATENT DOCUMENTS

| | | | | | |
|---|---|---|---|---|---|
| CN | 105707056 A | * | 6/2016 | ............ | A01M 99/00 |
| CN | 106719463 A | * | 5/2017 | ............ | A01K 67/033 |

OTHER PUBLICATIONS

Machine translation of CN-105707056-A to Dai. (Year: 2016).*
Machine translation of CN-106719463-A to Chen. (Year: 2017).*

*Primary Examiner* — Kathleen Alker
(74) *Attorney, Agent, or Firm* — John Fado; Robert Jones

(57) ABSTRACT

The bee washing system washes worker bees and filters out varroa mites so that a beekeeper/operator can estimate the number of infected bees in a hive. The system includes a bee containment section with a coarse mesh filter, and a wash material section with a fine mesh filter. The system is structured so that when the bee containment section is loaded with bees, and the wash material section is loaded with wash material, an operator washes the bees by shaking the system. When the wash is complete, the operator detaches the wash material section from the system and counts the mites present on the fine mesh filter.

16 Claims, 4 Drawing Sheets

(56) References Cited

U.S. PATENT DOCUMENTS

| | | | | |
|---|---|---|---|---|
| 2012/0091131 A1* | 4/2012 | Arjomand | ............... | B65D 7/22 |
| | | | | 220/4.01 |
| 2014/0238949 A1* | 8/2014 | Patel | ....................... | B65D 1/04 |
| | | | | 215/6 |
| 2016/0212977 A1* | 7/2016 | Krieger | .................. | A01K 51/00 |
| 2020/0068856 A1* | 3/2020 | Ford | ..................... | A01K 47/06 |

* cited by examiner

SYSTEM AND METHOD FOR REMOVING VARROA MITES FROM BEES

FIELD OF THE INVENTION

The disclosed subject matter relates to a system and method of removing varroa mites from bees during a hive sampling process. Specifically, the subject matter described herein relates to a unitary bee washing device for "washing" the varroa mites from a selected sample of worker bees. The number of varroa mites infecting the sample bees is used to estimate the number of mites infecting the hive.

BACKGROUND OF THE INVENTION

A varroa mite is a parasite with a direct economic impact on the beekeeping industry. Varroa mites attach to external surfaces of a bee's body and tap into the bee's fat tissues. The mites are a vector for at least five debilitating bee viruses, including RNA viruses such as the deformed wing virus. A varroa mite can reproduce only in a honeybee colony. An extensive varroa mite infestation can lead to the death of the colony, usually during the winter months. Varroa mites are one of the most significant stress factors causing a decline in world-wide bee populations.

To diagnose and treat a varroa mite infestation, beekeepers must accurately gauge the number of varroa mites infecting a selected hive. Specifically, beekeepers must be able to determine when the mite populations in their hives exceed a threshold of ~3 mites/100 bees. Beekeepers use two general methods to do this: (1) sticky traps are placed on the hive floor to capture fallen mites—and the extent of the infestation is estimated based on the number of mites in the sticky trap; and, (2) a sample of worker bees is collected and the number of mites present on the sample bees is used to estimate the extent of the hive infestation.

Beekeepers using the sampling method "wash" the worker bees to remove the mites. The washing process involves using a 'sugar roll' and/or various liquid washes—usually alcohol or water. Although the inventor's current device/system is primarily designed to work using the liquid wash process, the device can also be used with the sugar roll process by replacing the liquids with confectioners sugar and adding an extra step to the process (as further described infra). Some beekeepers prefer the sugar roll process because the bees are not permanently harmed, however the sugar roll process is not considered as accurate as the liquid wash processes.

FIG. 1 shows an exploded sectional view of a typical prior art washing device 10. Prior art washing devices 10 typically comprise a lid 12, a filter bowl 14, and an outer containment jar 16. The mesh size for the "filter" of the filter bowl 14 only needs to be small enough to prevent the bees from escaping the filter bowl 14. In one prior art embodiment, the filter bowl 14 is essentially a perforated and/or vented plastic basket. A wash material 18 is deposited in the bottom of the outer containment jar 16.

In operation, in the prior art "wash" processes, the bottom of the containment jar 16 is filled with the washing material 18. A sample of bees is then placed in the filter bowl 14 and the filter bowl 14 is fitted into the containment jar 16. The lid 12 is then securely fastened to the top of the containment jar 16 to prevent the bees from escaping from the washing device 10. The washing device 10 is then shaken and/or inverted so that the washing material 18 covers and "washes" the bees.

After the washing process, the spent washing material 18 (with the entrained mites) flows back into the bottom of the containment jar 16. The washing device 10 is then opened and the filter bowl 14 and bees are removed. The spent washing material 18 is then poured from the prior art washing device 10 through a "fine" filter medium into a secondary container so that the fine filter medium (ideally) filters out the varroa mites.

However, the accuracy of the varroa mite count is negatively affected by the need to transfer the spent wash material 18 to a secondary container. The varroa mites in the spent washing material 18 can "settle out" in the washing device 10 or adhere to the sides of the device 10 as the spent washing material 18 is poured through the fine filter. Depending on the type of prior art device used, spent washing material 18 can be spilled or inadvertently run down the side of the secondary container during the pouring and washing material 18 transfer process Further, the use of non-standard "fine" filters also negatively impacts the accuracy of the mite count. As a practical matter, there is a broad spectrum of filter medium used to filter the mites from the spent wash material—which introduces further opportunities for variations in the mite count. Beekeepers use a variety of "fine" materials to filter out the mites—including cloth, filter paper, wire mesh, porous membranes, or any other medium that the beekeeper considers to be a sufficient filter. Additionally, the inconvenience of just trying to locate and procure a proper fine filtering material is also a burden on the beekeeper.

The need exists for a reliable means of washing varroa mites from bees that provides an accurate, standardized count of the number of varroa mites infecting the bees. As shown in FIGS. 2-4, the inventor's system described herein comprises a unitary bee washing device that incorporates all of the components necessary to both wash a sample of bees, and to filter the spent wash material so that an operator can easily count the number of varroa mites present. For example, the system described herein incorporates both coarse and fine filters that are built into a unitary bee washing device. The inventor's system is capable of both washing the bees and presenting the removed varroa mites in an easy-to-count manner so that beekeepers can more easily sample and manage their hives.

SUMMARY OF THE INVENTION

This disclosure is directed to a system 20 for washing varroa mites from bees. The system 20 comprises a unitary washing device having a bee containment section 22, and a wash material section 24. The bee containment section 22 includes a top end cap 30 and a coarse mesh filter 26 so that the bees are contained between the top end cap 30 and the coarse mesh filter 26. The wash material section 24 is defined by a fine mesh filter 28 and a bottom end cap 40. The system is structured so that when the bee containment section 22 is loaded with bees, and the wash material section 24 is loaded with wash material 19, an operator washes the bees by shaking the unitary washing device 20 so that when the wash is complete, spent wash material 19 drains through a standardized fine mesh 28 and the fine mesh 28 filters out the varroa mites.

BRIEF DESCRIPTION OF THE DRAWINGS

FIG. 2 shows the system 20 in a vertical operating position.

FIG. 4 also shows the wash material 19 ghosted into the section 24 end cap 40.

DETAILED DESCRIPTION OF PREFERRED EMBODIMENTS

Figure 1:
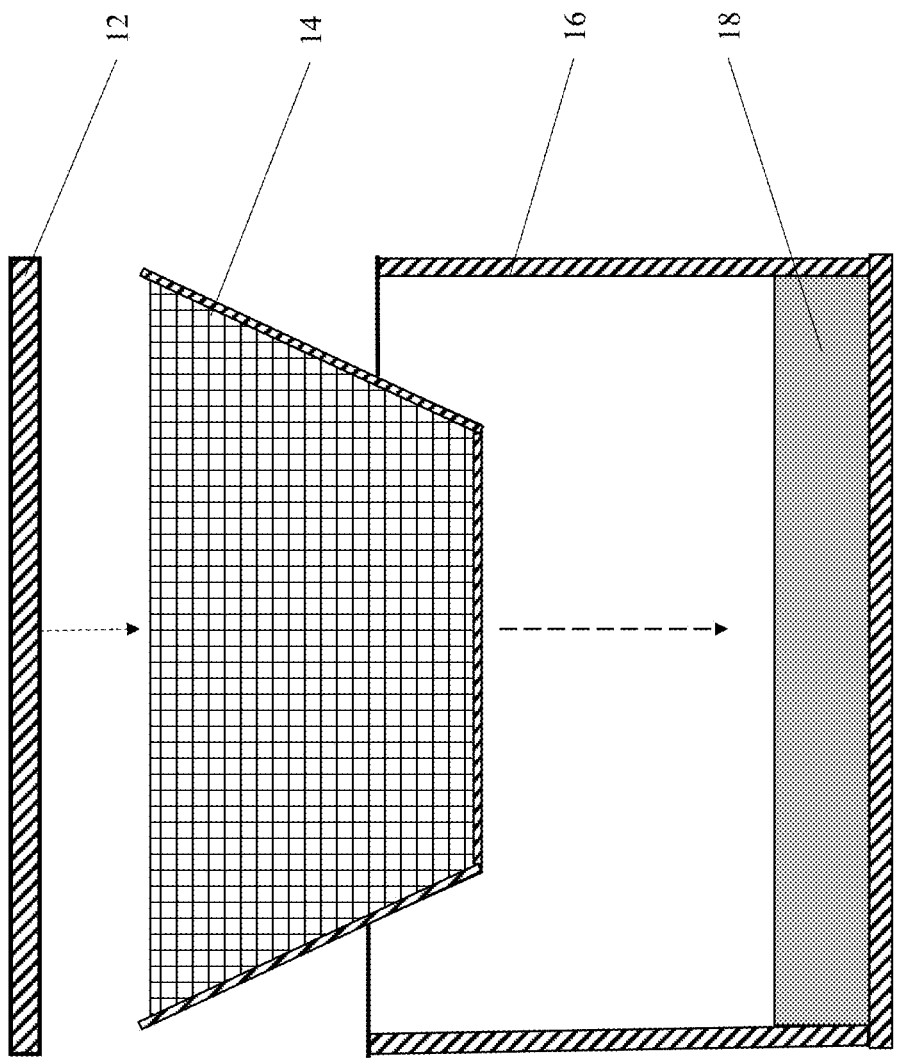
FIG. 1 is a sectional view of a prior art bee washing device 10.
Figure 1:
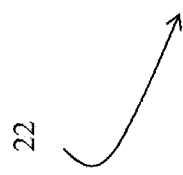
Figure 2:
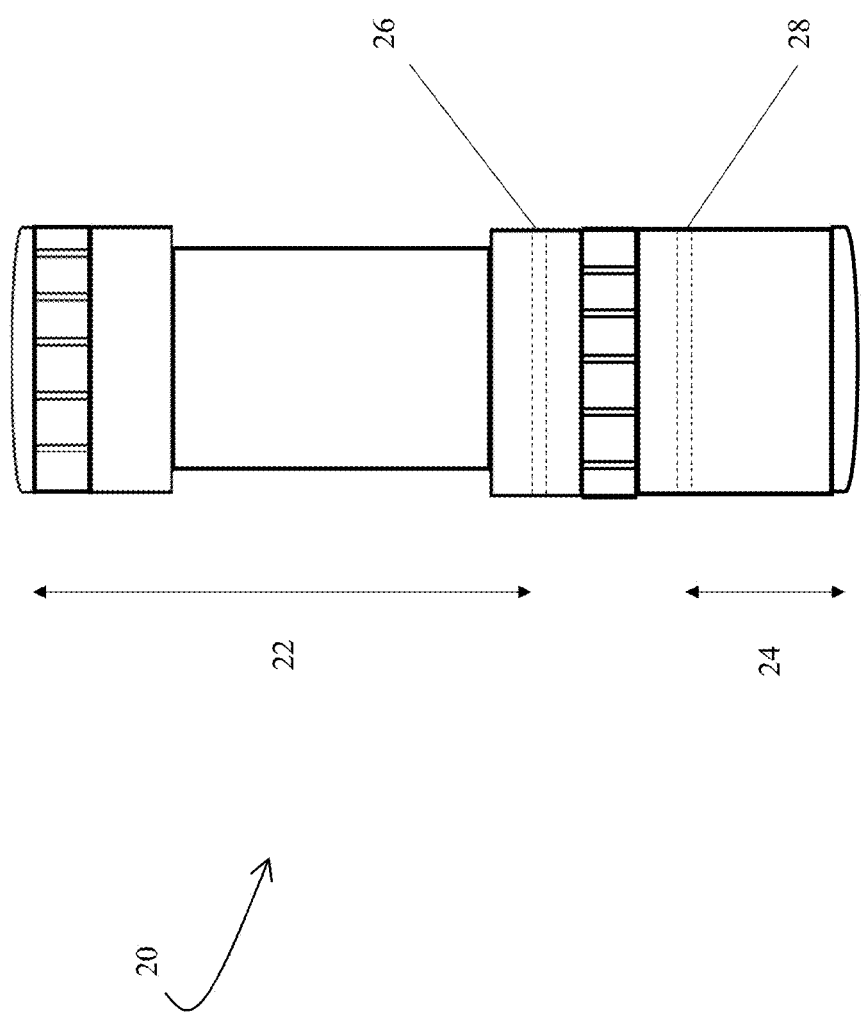
FIG. 2 is a front view of the assembled current bee washing system 20 as described herein.
Figure 3:
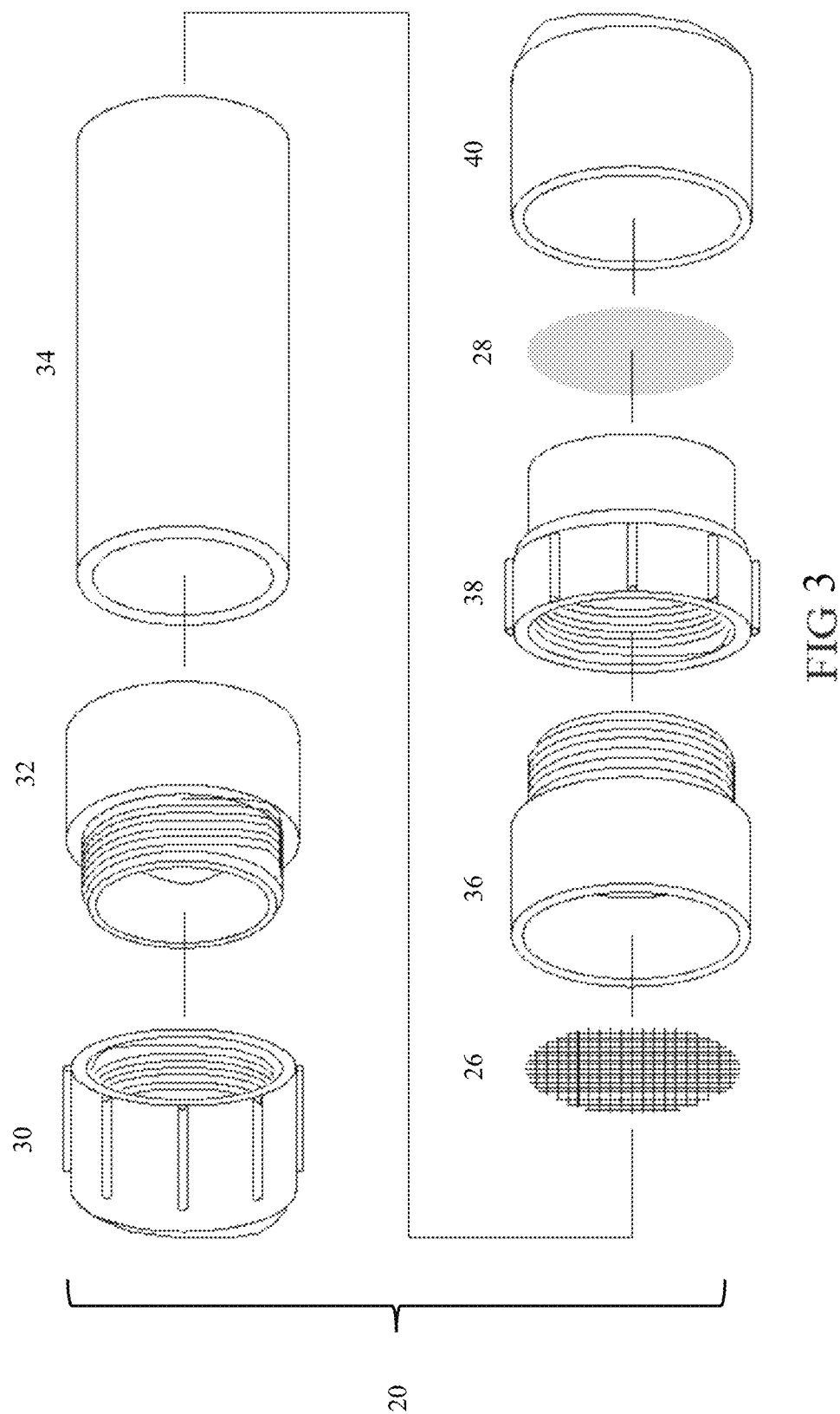
FIG. 3 is an exploded assembly view of the current bee washing system 20 as described herein.
Figure 4:
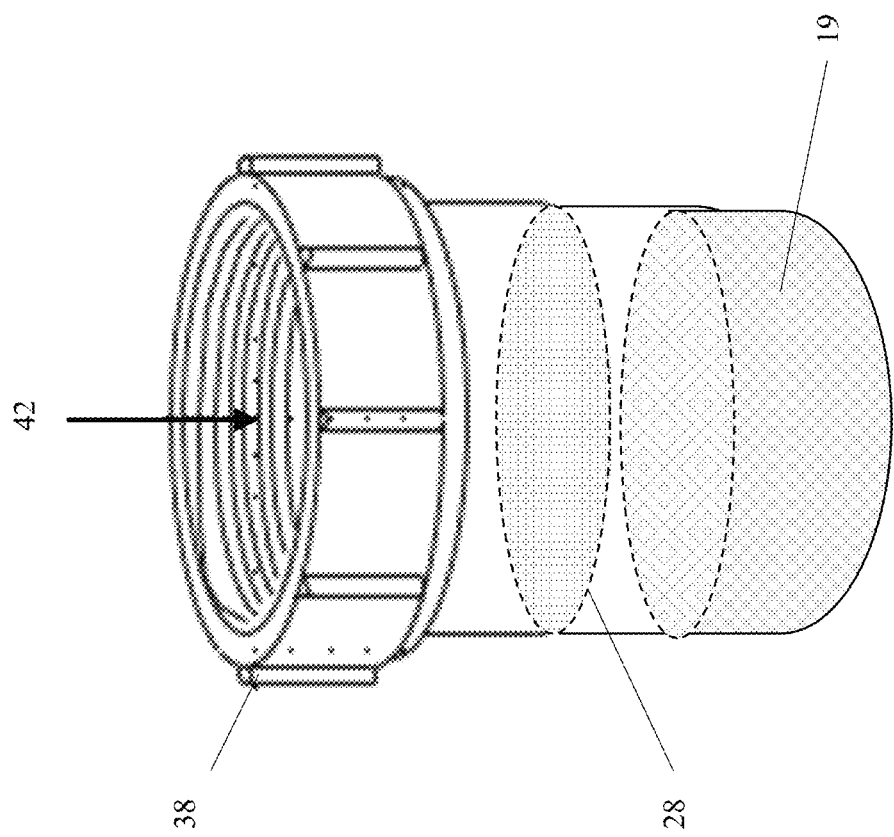
FIG. 4 is a perspective view of the wash material section 24—the wash material section 24 comprising a coupling 38, an end cap 40, and a fine mesh filter 28 (see FIG. 3).

As generally shown in FIGS. 2-4, the system and method described herein comprises a system 20 for "washing" a sample of bees and then filtering the spent washing material 19.

For the purposes of this disclosure, "wash material" comprises a material used to wash bees as described herein. "Spent wash material" is wash material 19 that has been used to wash the sample bees and may or may not include entrained varroa mites—depending on whether any varroa mites were dislodged during the washing process and/or whether the spent wash material 19 has been filtered. For the sake of simplicity, reference number 19 shown in FIG. 4 schematically represents all of the wash material 19 discussed in this disclosure.

The system 20 comprises multiple sections of tubing assembled to construct a "unitary bee washing device". For the purposes of this disclosure, a "unitary bee washing device" (or just "unitary washing device") comprises a single modular independent device/housing that incorporates a set of components/elements that allows the device 20 to function independently. No outside containment devices or filters are required to operate the system/unitary washing device 20 described herein.

FIG. 2 shows the system/device 20 in the vertical operating position. The system 20 comprises a bee containment section 22, and a wash material section 24. The sample bees are loaded into and retained in the bee containment section 22, and the wash material section 24 retains the wash material 19 before and after the washing process. The individual components of the sections 22, 24 are shown in FIG. 3 and further described infra. When the system 20 is loaded with bees and wash material 19, then the bee wash process can be initiated.

As shown in FIGS. 2-3, The bee containment section 22 is defined by a top (first) end cap 30 at the top of the bee containment section 22, and a course screen 26, at the bottom of the section 22. The sample bees are retained between the top end cap 30 and the coarse screen 26. For the purposes of this disclosure, a "coarse filter" has a screen (or other filtering structure) having a mesh (or the structural aperture equivalent) size between 0.0331-0.1164 in. (preferably 0.0970 in). Essentially, the structural mesh (or filter equivalent) aperture size must be small enough so that the bees are retained. Similar to the coarse "filter" used in the prior art, the coarse filter 26 may comprise a plastic basket-type structure or any other structure consistent with the function of containing the bees in the bee containment section 22.

The wash material section 24 is defined by a fine filter 28 at the top of the wash material section 24, and a (second) bottom end cap 40 at the bottom of the section 24. For the purposes of this disclosure, a "fine filter" comprises a screen (or other filtering structure) having a structural mesh (or filter equivalent) size between 0.0070-0.0281 in. (preferably 0.0234 in.). Essentially, the structural mesh (or filter equivalent) aperture size must be small enough so that the mites are filtered out and retained on the upper surface of the fine filter 28. In alternative embodiments, the fine filter 28 may comprise any structure known in the art consistent with the function of filtering the varroa mites from the spent wash material 19 and presenting the mites for counting by the beekeeper.

For the purposes of this disclosure, the phrase "defined by" with reference to the system 20 structure, means "vertically bounded by". Further, although end "caps" are used in the preferred embodiment, in alternative embodiments the end caps or "ends" are more broadly defined as barrier-type structures and are not specifically limited to cap-type components.

As shown in FIG. 3, in the preferred embodiment, the system 20 comprises a top (first) end cap 30. The top end cap 30 is connected (via screw threads) to a threaded end of a coupling 32. An unthreaded end of the coupling 32 is connected via a friction fit to a top (first) end of a linking body tube 34. A bottom (second) end of the body tube 34 connects with a top (first) friction fit end of a second coupling 36. In the preferred embodiment, the coarse screen 26 is sandwiched between the bottom end of the body tube 34 and a top (first) end of the coupling 36.

As further shown in FIG. 3, the bottom end of the coupling 36 is attached (via screw threads) to a top (first) end of a collar 38. A fine mesh screen 28 is attached to the bottom (second) end of the collar 38. A (second) end cap 40 slides onto the friction fit end of the collar 38.

As best shown in FIG. 4, the preferred way to count the number of varroa mites washed from the bee sample is to unscrew the collar 38 (with fine mesh screen 28 and end cap 40 attached) from the system 20, thereby detaching the wash material section 24 from the device 20. A beekeeper then looks downwardly through the top of the collar 38 in the direction of the arrow 42 and counts the mites present on the upper surface of the screen 28. Optionally, as shown in FIG. 4, the end cap 40 may also be removed from the bottom of the collar 38 to better illuminate the mites.

In the "sugar roll" process, confectioners sugar is used as the wash material 19. After being coated with the sugar, the bees naturally shake and clean the sugar from their bodies and, in the process, also dislodge varroa mites. The spent confectioners sugar and the dislodged mites collect on the upper surface of the fine mesh filter 28. The beekeeper then detaches the wash material section and pours water on the sugar with entrained mites—which dissolves the sugar and leaves the mites visible on the upper surface of the fine mesh filter 28. Essentially, in due course, as with the liquid washes, the spent wash material 19 (in dissolved sugar form) collects in the bottom of the wash section 24, as shown in FIG. 4. The beekeeper then observes and counts the mites on the upper surface of the fine filter 28 as described supra.

In further alternative embodiments, alternative wash materials should be considered within the scope of the invention. "Alternative wash materials" include at least solvents, soaps, miticides, insecticides, gasses, slurries, combinations thereof and other wash material capable of removing mites from bees.

In operation, as best shown in FIGS. 2-4, when a beekeeper wants to determine whether to treat his hive for varroa mites, the beekeeper collects a sample of worker bees for a wash test. The beekeeper unscrews the end cap 30 from the unitary bee washing device/system 20 and loads the bees into the system 20. As described supra, the sample bees are contained within the bee containment section 22 of the system 20.

In the preferred (liquid wash embodiment), as best shown in FIGS. 2 and 3, with the system 20 in a vertical operating position and the bee containment section 22 loaded with bees, the beekeeper unscrews the collar 38 (with attached fine filter 28 and end cap 40) to remove the wash material section 24 from the bottom of the unitary device/system 20. The beekeeper then pours a wash material 19 (preferably water) through the collar 38, and the fine mesh screen 28 and into the end cap 40. The beekeeper then screws the collar 38 back into the system 20 so that the system 20 is ready for the wash.

The beekeeper initiates the wash by shaking the system 20 so that the bees in the bee containment section 22 are thoroughly washed and the wash process is complete. For the purposes of this disclosure, "shaking" the unitary bee washing system 20 means shaking and/or rotating the system 20 and/or moving the system 20 vertically, diagonally, horizontally, and/or inverting the system 20 (and combinations of all of the above). For the purposes of this disclosure, the wash is considered "complete" when the bees are coated (at least once) with wash material 19.

When the wash is complete, while holding the system 20 in the vertical operating position (as shown in FIG. 2), the beekeeper unscrews the wash material section 24 (via the collar 38) from the system 20 and (optionally) also removes the bottom end cap 40. The beekeeper then counts the mites visible on the fine screen 28 by looking downwardly through the top of the collar 38 in the direction of the arrow 42 as shown in FIG. 4. Based on the mite count, the beekeeper estimates the number of bees in the hive that are infected with varroa mites. Typically, if the number of varroa mites exceeds the threshold of about 3 varroa mites per 100 bees, then the beekeeper treats the hive.

For the foregoing reasons, it is clear that the subject matter described herein provides an innovative bee washing system. Although the components are generally located as shown in the figures, the figures should not be considered to be precisely to scale. Although the location of the bee containment section 22 relative to the wash material section 24 is correct, the exact dimensions of the sections 22, 24 and precise location of the screens 26, 28 may vary.

Further, multiple alternative embodiments should be considered within the scope of the current invention. For example, in one embodiment, the system 20 may be comprised of two- or three-inch polyvinylchloride (PVC) tubing, however in further embodiments the dimensions of the system components may be varied so long as the dimensions of the components are consistent with the functions described herein.

In a further embodiment, some or all sections of the tubing may be transparent, and the tubing may be square, triangular, or have other geometric cross sections. In alternative embodiments the various sections of the system may be connected via any means known in the art including (but not limited to) screw threads, friction fits, adhesives, clips, welds, interlocking fasteners, tapes, or any other means consistent with the function of joining the sections.

The current system may be modified in multiple ways and applied in various applications. The disclosed method and apparatus may be modified and customized as required by a specific operation or application, and the individual components may be modified and defined, as required, to achieve the desired result. For example, the washing material may comprise any solid, liquid, or gas (including slurries) known in the art and the subject of the wash may comprise other arthropods.

Although the materials of construction are only generally described, they may include a variety of compositions consistent with the function described herein. Such variations are not to be regarded as a departure from the spirit and scope of this disclosure, and all such modifications as would be obvious to one skilled in the art are intended to be included within the scope of the following claims.

The amounts, percentages and ranges disclosed in this specification are not meant to be limiting, and increments between the recited amounts, percentages and ranges are specifically envisioned as part of the invention. All ranges and parameters disclosed herein are understood to encompass any and all sub-ranges subsumed therein, and every number between the endpoints. For example, a stated range of "1 to 10" should be considered to include any and all sub-ranges between (and inclusive of) the minimum value of 1 and the maximum value of 10 including all integer values and decimal values; that is, all sub-ranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

Unless otherwise indicated, all numbers expressing quantities of ingredients, properties such as molecular weight, reaction conditions, and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. Similarly, if the term "about" precedes a numerically quantifiable measurement, that measurement is assumed to vary by as much as 10%. Essentially, as used herein, the term "about" refers to a quantity, level, value, or amount that varies by as much 10% to a reference quantity, level, value, or amount.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein.

What is claimed is:

1. A system for washing varroa mites from bees, the system comprising:
   a unitary washing device having a bee containment section, and a wash material section;
      the bee containment section being defined by a first end comprising a first end cap at a top of the bee containment section, and a coarse filter adjacent to a collar in a bottom portion of the bee containment section, the bees being contained between the first end cap and the coarse filter; and the wash material section being defined by a fine filter adjacent to the collar in an upper portion of the wash material section, and a second end cap at a bottom of the wash material section, so that when the unitary washing device is in a vertical operating position, the fine filter is below the coarse filter, and the bee containment section is connected to the wash material section;

whereby when a wash is complete, the system is structured to enable an operator to disconnect the bee containment section from the wash material section and count the varroa mites on the fine filter.

2. The system of claim 1 wherein, the system is structured to enable bees to be loaded into the system by removing the first end from the system and loading the bees so that the bees are above the coarse filter.

3. The system of claim 1 wherein the coarse filter has a mesh size in the range of 0.0331-0.1164 inches.

4. The system of claim 1 wherein, the coarse filter and the fine filter comprise screens.

5. The system of claim 1 wherein, after the wash is complete, in the vertical operating position, the system is structured so that a wash material that has been used to wash the bees is filtered through the coarse filter, and then through the fine filter, and then flows to the second end cap.

6. The system of claim 1 wherein, the system is structured to enable a wash material to be loaded into the system by detaching the wash material section from the bee containment section.

7. The system of claim 6 wherein the system is structured to enable the wash material to be poured through the fine filter and into the wash material section.

8. The system of claim 1 wherein the system is structured to enable the varroa mites to be counted on an upper surface of the fine filter.

9. The system of claim 1 wherein the fine filter has a mesh size in the range of 0.0070-0.0281 inches.

10. The system of claim 1 wherein the unitary washing device is comprised of two-inch poly vinyl chloride tubing.

11. The system of claim 10 wherein at least some of the tubing is transparent.

12. The system of claim 1 wherein a wash material is selected from the group consisting of water, alcohol, sugar, alternative wash materials, and various combinations thereof.

13. A method of washing bees, the method consisting of the steps of:
 (a) supplying the system of claim 1;
 (b) loading the bee containment section with bees;
 (c) loading the wash material section with a wash material; and then
 (d) shaking the unitary washing device until the wash is complete.

14. A method of surveying a sample of bees for varroa mites, the method comprising:
 (a) washing the sample of bees using the method described in claim 13;
 (b) detaching the wash material section from the bee containment section: and,
 (c) looking down into the wash material section and counting the varroa mites on the fine filter.

15. The method of claim 14 wherein, in step (a), a wash material is selected from the group consisting of water, alcohol, sugar, and various combinations thereof.

16. A method of washing bees comprising the steps of:
 (a) providing the system of claim 1;
 (b) disconnecting the bee containment section from the wash material section and loading bees in the bee containment section;
 (c) loading wash material in the wash material section; and
 (d) connecting the bee containment section to the wash material section, and shaking the bee washing device so that when a bee wash is complete, the wash material filters through the coarse filter, and then through the fine filter;
 (e) removing the wash material section from the bee containment section; and
 (f) counting a number of varroa mites on the fine filter.

* * * * *